US007970428B2

(12) United States Patent
Lin et al.

(10) Patent No.: US 7,970,428 B2
(45) Date of Patent: *Jun. 28, 2011

(54) MONITORING AND ADJUSTING TRANSMIT POWER LEVEL(S) IN A COMMUNICATIONS SYSTEM

(75) Inventors: Wen-Pin Lin, Morristown, NJ (US); Wesley L. Shanks, Madison, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 12/757,192

(22) Filed: Apr. 9, 2010

(65) Prior Publication Data

US 2010/0197340 A1     Aug. 5, 2010

Related U.S. Application Data

(63) Continuation of application No. 10/645,807, filed on Aug. 21, 2003, now Pat. No. 7,769,406.

(51) Int. Cl.
*H04B 7/00* (2006.01)

(52) U.S. Cl. ............ 455/522; 455/67.11; 455/115.1; 370/241; 370/246; 375/213

(58) Field of Classification Search .......... 455/67.11, 455/67.13, 67.14, 69, 115.1, 115.3, 423, 455/424, 452.2, 522; 370/241, 246, 252; 375/213

See application file for complete search history.

(56) References Cited

U.S. PATENT DOCUMENTS

| | | | | |
|---|---|---|---|---|
| 5,574,993 A * | 11/1996 | Kobayashi et al. | ............ | 455/126 |
| 6,701,136 B2 * | 3/2004 | Kim | ............ | 455/115.1 |
| 7,158,812 B2 * | 1/2007 | Lee et al. | ............ | 455/561 |
| 7,324,785 B2 * | 1/2008 | Hansen et al. | ............ | 455/69 |
| 2002/0188764 A1 * | 12/2002 | Mortazavi et al. | ............ | 709/315 |
| 2004/0092281 A1 * | 5/2004 | Burchfiel | ............ | 455/522 |
| 2004/0180686 A1 * | 9/2004 | Nakayama | ............ | 455/522 |
| 2004/0257988 A1 * | 12/2004 | Evans et al. | ............ | 370/230 |
| 2005/0068902 A1 * | 3/2005 | Rath | ............ | 370/256 |
| 2006/0018289 A1 * | 1/2006 | Schulist et al. | ............ | 370/335 |

* cited by examiner

*Primary Examiner* — Tuan H Nguyen
(74) *Attorney, Agent, or Firm* — Williams, Morgan & Amerson, PC

(57) ABSTRACT

A method and an apparatus is provided for monitoring and adjusting a power level of a transmitting component. The method comprises receiving a request from a remote unit to provide a power level associated with a transmitting component, wherein the request is transmitted over a communications protocol. The method includes measuring a power level of a signal provided by the transmitting component in response to receiving the request from the remote unit, and providing the measured power level to the remote unit over the communications protocol.

28 Claims, 4 Drawing Sheets

MONITORING AND ADJUSTING TRANSMIT POWER LEVEL(S) IN A COMMUNICATIONS SYSTEM

"This application is a continuation of U.S. application Ser. No. 10/645,807, filed on Aug. 21, 2003, now U.S. Pat. No. 7,769,406 herein incorporated by reference in its entirety for all purposes."

BACKGROUND OF THE INVENTION

1. Field of the Invention

This invention relates generally to a communications system, and, more particularly, to monitoring and adjusting the transmit power level of one or more channels (e.g., the paging, synchronization, pilot, and traffic channels) of the communications system.

2. Description of the Related Art

In the field of wireless telecommunications, such as cellular telephony, a system typically includes a plurality of base stations that are strategically distributed within an area to communicate with users. Various users within the area, fixed or mobile, may then access the system and, thus, other interconnected telecommunications systems, via one or more of the base stations. Typically, a mobile user maintains communications with the system as the user passes through an area by communicating with one and then another base station, as the user moves. The user may communicate with the closest base station, the base station with the strongest signal, the base station with a capacity sufficient to accept communications, etc. Thus, the base stations play a key role for wireless communications.

To maintain a high level of performance, the remotely situated base stations are periodically serviced by technicians. For example, the technicians may perform a power calibration procedure on the base station to ensure that the transmit power levels of the various channels (e.g., pilot, paging, synch, traffic) are at the desired levels. The calibration procedures may be performed for a variety of reasons. For example, calibration may be desired if one or more radio frequency (RF) components in the transmit path of the base station are replaced, if transmit power problems are suspected, or if routine maintenance is performed.

Performing power calibration, however, requires a considerable amount of resources and time. The existing calibration procedure requires the technicians to drive to the remote location of the base station and then to perform a variety of time-consuming, manual calibration steps. For example, the technician first needs to prepare the power meter test equipment, which may include selecting an appropriate power meter out of many available meters for a given base station, reading the technical manual associated with the selected power meter to gain an understanding of the features of that meter, and initializing the power meter (e.g., warming the meter for stabilization) so that an accurate power reading can be taken. Once the power meter is prepared, the technician disconnects a jumper cable from an antenna port of the base station, and then attaches an attenuator and the power meter to the antenna port.

Once the attenuator and the power meter are connected, the technician can measure the power level of one or more components (e.g., radio module) of the base station. However, before measuring a power level of a particular component of the base station, the technician, as part of the calibration process, may need to turn off other transmitting components in the base station to reduce interference. Once the power level is measured, the technician then determines if the measured power level is within an acceptable range based on, for example, an acceptable range defined by the base station's specification. If the measured power level is not at a desired level (i.e., calibration is required), the technician manually adjusts the power level of the base station component until the transmit power is at the desired level.

The above-described calibration procedure can be time consuming, in part because the calibration procedure requires one or more technicians to go to the physical location of the base station to be serviced and because of the various, laborious manual calibration steps involved. The manual calibration steps can not only be time consuming but can also be prone to errors because of the excessive reliance on human intervention. If proper care is not taken, mistakes or errors made during the calibration procedure can damage valuable test equipment, such as power meters. For example, a power meter may be damaged if a technician fails to attach an attenuator before connecting the power meter to the antenna port. Similarly, other electronic components of the base station or test equipment may also be damaged if proper care is not exercised, resulting in the loss of valuable equipment and increasing costs for the service provider.

The present invention is directed to overcoming, or at least reducing, the effects of, one or more of the problems set forth above.

SUMMARY OF THE INVENTION

In one embodiment of the present invention, a method for monitoring a power level is provided. The method comprises receiving a request from a remote unit to provide a power level associated with a transmitting component, wherein the request is transmitted over a communications protocol. The method includes measuring a power level of a signal provided by the transmitting component in response to receiving the request from the remote unit, and providing the measured power level to the remote unit over the communications protocol.

In a further embodiment of the present invention, an article comprising one or more machine-readable storage media containing instructions to monitor and adjust a power level of a component. The one or more instructions, when executed, enable the processor to receive a request from a remote unit to indicate a power level of a signal provided by a transmitting component, determine a power level of the signal in response to receiving the request from the remote unit, determine if the measured power level is at an acceptable level, and adjust a power level of an output signal provided by the transmitting component by a preselected level in response to determining that the measured power level is not at the acceptable level.

In one embodiment of the present invention, an apparatus for monitoring a power level is provided. The apparatus includes an interface adapted to receive a request from a remote unit to adjust a transmit power level of a first component of a base station. The apparatus includes a control unit communicatively coupled to the interface. The control unit is adapted to determine a power level of an output signal of the first component in response to the request and to provide the determined power level of the output signal of the first component to the remote unit.

In a further embodiment of the present invention, a communications system is provided. The communications system comprises a remote unit adapted to provide a request to calibrate a transmit power level. The communications system comprises a base station that is communicatively coupled to the remote unit over a communications protocol. The base station is adapted to receive the request, measure a power level of a signal provided by a transmitting component, and determine if the measured power level is at an acceptable level. The base station is further adapted to adjust a power level of an output signal provided by the transmitting component by a preselected level in response to determining that the measured power level is not at the acceptable level.

BRIEF DESCRIPTION OF THE DRAWINGS

The invention may be understood by reference to the following description taken in conjunction with the accompanying drawings, in which like reference numerals identify like elements, and in which.

Figure 1:
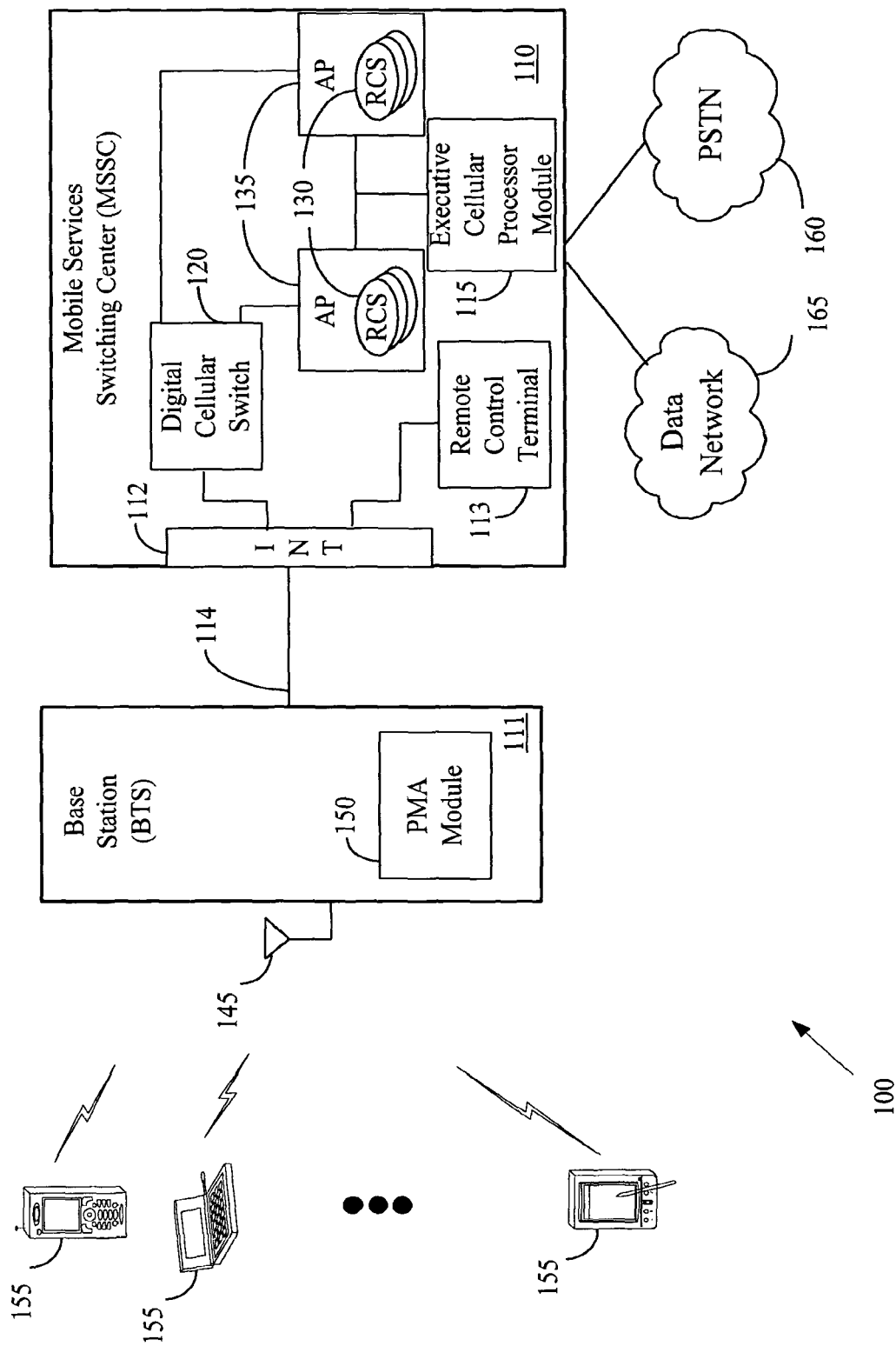
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 is a Code Division Multiple Access (CDMA) system, although it should be understood that the present invention may be applicable to other systems that support voice and/or data communication. CDMA is a "spread spectrum" technology, allowing many users to occupy the same time and frequency allocations in a given band/space. As its name implies, CDMA assigns unique codes to each communication to differentiate it from others in the same spectrum. CDMA includes second generation (2G) and third generation (3G) services. 2G CDMA standards are commonly known as CDMAONE and include the IS-95A and IS-95B standards. Two dominant standards for 3G services include CDMA2000 and wideband CDMA (CDMA2000 represents a family of technologies that includes CDMA2000-1X and CDMA2000-1xEV).

The communications system 100 includes a mobile services switching center (MSSC) 110 that supports voice and/or data services through a base station 111. The MSSC 110 may be coupled to the base station 111 via an interface 112 by a connection 114, which may be a wireless connection or a wired connection, such as T1 and/or E1 lines or circuits, ATM circuits, cables, and optical digital subscriber lines (DSLs). For ease of illustration, only one base station 111 is illustrated, although it should be understood that the MSSC 110 may communicate with more than one base station 111.

In accordance with one embodiment of the present invention, and as described in greater detail below, the MSSC 110 includes a remote control terminal 113 that monitors and calibrates the transmit power of one or more components (e.g., radio module) of the base station 111. While the remote control terminal 113 is located at the MSSC 110 in the illustrated embodiment, it should be appreciated that in an alternative embodiment, the remote control terminal 113 may be located in any other desirable location. In one embodiment, the ability to remotely calibrate the transmit power reduces the need for dispatching technicians to the physical location of the base station 111.

Any acceptable protocol may be utilized for communications between the remote control terminal 113 and the base station 111. For example, in one embodiment, the High-level Data Link Control (HDLC) protocol may be employed to transmit data packets to and from the remote control terminal 113 and the base station 111. The HDLC protocol was developed by the International Organization for Standardization (ISO 3309).

In the illustrated embodiment of FIG. 1, the MSSC 110 comprises an executive cellular processor module 115, a digital cellular switch 120, one or more instances of radio cluster server (RCS) applications 130 executing on one or more application processors (AP) 135. The executive cellular processor module 115, in one embodiment, contains information used by the MSSC 110 to process calls, make service measurements, and provide Automatic Message Accounting (AMA). The digital cellular switch 120, in one embodiment, manages the connectivity between the base station 111 and the various communication networks. Depending on the implementation, the communications networks may include CDMA, Advanced Mobile Phone Service (AMPS), Global System for Mobile communication (GSM), Time Division Multiple Access (TDMA), and the like. The digital cellular switch 120 may also support landline Plain Old Telephone Service (POTS), intelligent networks, operator services, DS1 facilities, and the like.

In the illustrated embodiment, the application processor (AP) 135 is a central processing unit (CPU) that provides generic computing facilities to host a wide range of applications in the communications system 100. The AP 135 performs call processing, administration, and maintenance functions for the base station 111. In one embodiment, the AP 135 provides an integrated high-availability hardware and software platform that offers increased reliability, availability, and maintainability for its subtending network elements.

It is noted that the illustrated configuration of the MSSC 110 is exemplary in nature, and that in other embodiments, the MSSC 110 may include additional, fewer, or different components, based on the particular implementation. For example, the MSSC 110 may include an operational management platform (not shown) that allows multiple users to access selected interface functions supported by the executive cellular processor module 115. As another example, the MSSC 110 may include an interprocess message switch (not shown) that provides the physical terminals of the data links utilized for the exchange of call processing and maintenance messaging. Similarly, other arrangements may be possible without deviating from the spirit and scope of the invention.

The base station 111, in the illustrated embodiment, includes one or more antennas 145 and a power monitor and adjustment (PMA) module 150 that is responsive to requests from the remote control terminal 113 of the MSSC 110 to provide information regarding the transmit power level associated with one or more components of the base station 111. If it is determined that the power level is not at the desired level, a technician can utilize the remote control terminal 113 to adjust the power level from the mobile services switching center 110. The process of monitoring and adjusting the power level is described in greater detail below.

In the communications system 100 of FIG. 1, the MSSC 110 supports voice and/or data communications. In particular, the MSSC 110 allows one or more access terminals 155 to communicate with a public switched telephone network (PSTN) 160 and/or a data network 165, such as the Internet, through one or more base stations 111. The access terminal 155 may include one of a variety of devices, including cellular phones, personal digital assistants (PDAs), laptops, digital pagers, wireless cards, and any other device capable of accessing the PSTN 160 and/or data network 165 through the base station 111.

The data network 165 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 165 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
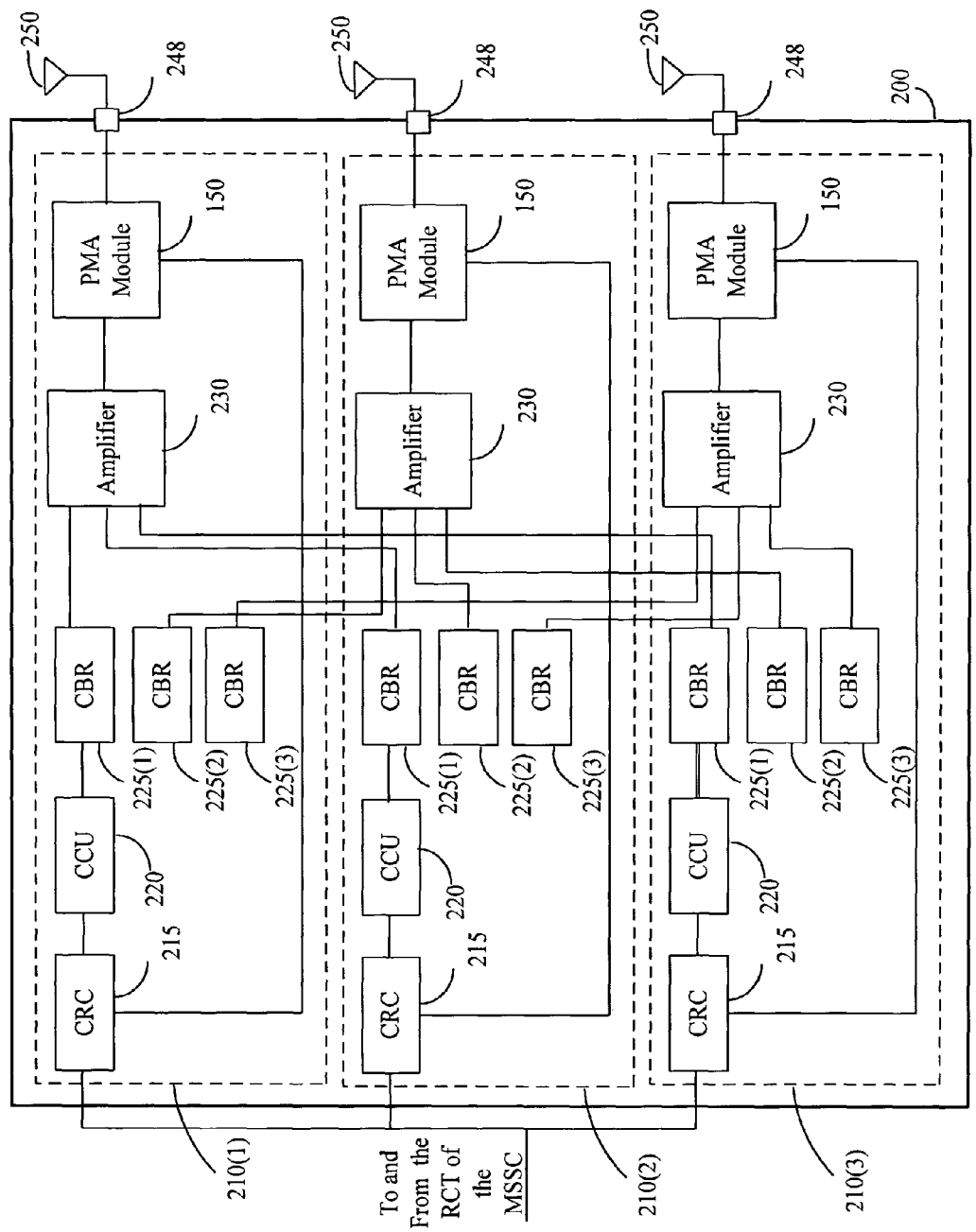
FIG. 2 depicts a block diagram of a base station that may be employed in the communications system of FIG. 1, in accordance with one embodiment of the present invention.

Referring now to FIG. 2, a block diagram of a base station 200 that may be employed in the communications system 100 of FIG. 1 is illustrated, in accordance with one embodiment of the present invention. The base station 200 is one embodiment of the base station 111 of FIG. 1. In the illustrated embodiment, the base station 200 includes three cell modules 210(1-3), although in alternative embodiments, the base station 200 may include fewer or additional cell modules 210, depending on the implementation. Those skilled in the art will appreciate that the cell modules 210(1-3), collectively, represent a three-carrier/three-sector configuration. If a configuration with additional carriers and sectors is desired, then additional cell modules 210 may be employed. For example, if a six-carrier and six-sector configuration is desired, then six cell modules 210 may be utilized. Similarly, if fewer carriers and sectors are desired, then fewer cell modules 210 can be employed.

In the illustrated embodiment, the cell modules 210(1-3) include a CDMA Radio Controller (CRC) 215, where the CRC 215 handles the HDLC protocol processing of packet pipes and signaling links, as well as handles maintenance and call processing functions. If desired, each cell module 210 may include an additional CRC 215 to provide redundancy.

In the illustrated embodiment, the cell modules 210(1-3) include a CDMA channel unit (CCU) 220, where the CCU 220 supports a plurality of channel elements and provides channel coding and decoding functions for selected channels (e.g., pilot, synchronization, paging, access, traffic channels). A pilot channel can be utilized by an access terminal 155 (see FIG. 1) to establish communication with the base station 200, a synchronization channel may be utilized by an access terminal 155 to acquire initial time synchronization, a paging channel can be utilized by the base station 200 to transmit system overhead information and pages to an access terminal 155. An access channel may be utilized by the access device 155 to transmit various types of messages to the base station 200, and a traffic channel is utilized to transmit voice and/or data.

In the illustrated embodiment, each of the cell modules 210(1-3) of the base station 200 includes one or more CDMA baseband radios (CBRs) 225(1-3). Generally, for the transmit path, the CBR 225 receives a signal from the CCU 220, filters the received signal and converts it to analog form, and then modulates the analog signal onto an Intermediate Frequency (IF) carrier for additional filtering, gain, and frequency up-conversion. For the received path, the CBR 225 downcoverts the received signals (two diversity signals), converts the received signals to digital form, and performs automatic gain control on the signals, and provides the signals to the CCU 220 for decoding.

In accordance with one embodiment of the present invention, the amount of attenuation provided by the CBR 225 for the transmit path is adjustable. Thus, in one embodiment, the CBR 225 can provide a preselected amount of transmit power attenuation in preselected increments. For example, the CBR 225 may provide up to 12 dB of transmit power attenuation, in 0.5 dB increments.

As noted, the cell modules 210(1-3) of the base station 200 represent a three-carrier, three-sector configuration. Each cell module 210 represents a carrier. Thus, the first cell module 210(1) supports communication over a first carrier frequency, the second cell module 210(2) supports communication over a second carrier frequency, and the third cell module 210(3) supports communication over a third carrier frequency. Each CBR 225 of a given cell module 210 represents one sector. For example, the first, second, and third CBR 225(1-3) of the first cell module 210(1) may represent the alpha, beta, and gamma sector, respectively.

In the illustrated embodiment of FIG. 2, the first CBR 225(1) of each cell module 210(1-3) is coupled to the amplifier 230 of the first cell module 210(1), the second CBR 225(2) of each cell module 210(1-3) is coupled to the amplifier 230 of the second cell module 210(2), and the third CBR 225(3) of each cell module 210(1-3) is coupled to the amplifier 230 of the third cell module 210(3). In other words, each alpha sector CBR 225(1) is coupled to the amplifier 230 of the first cell module 210(1), each beta sector CBR 225(2) is coupled to the amplifier 230 of the second module 210(2), and each gamma sector CBRs 225(3) is coupled to the amplifier 230 of the third module 210(3). The amplifier 230 increases the RF output power level from the CBR 225 to an output power level called for by a specification of the base station 200.

In the illustrated embodiment, each cell module 210 includes a PMA module 150 that is coupled between the amplifier 230 and an antenna port 248 of that cell module 210. An antenna 250 is adapted to couple each of the cell modules 210(1-3) through the respective antenna port 248. In the illustrated embodiment, each sector has an associated antenna 250. For example, the coverage for the alpha sector (i.e., the CBRs 225(1) of the cell modules 210(1-3)) is provided by the top antenna 250, while the coverage for the beta sector (i.e., CBRs 225(2)) and the gamma sector (i.e., CBRs 225(3)) is provided by the respective middle and bottom antennas 250. As described in greater detail below, the PMA module 150 allows a technician to control the RF transmit power levels from the remote control terminal 113 located at the MSSC 110.

It should be understood that the configuration of the base station 200 of FIG. 2 is exemplary in nature, and that a variety of other configurations may be employed in other embodiments. For example, in one embodiment, a single PMA module 150 may be employed to monitor and adjust the RF transmit power. In one embodiment, the PMA module 150 may be interconnected between the CBR 225 and the amplifier 230. In yet another embodiment, the PMA module 150 may be utilized to control the power levels of the various sectors (e.g., alpha, beta, gamma) for a given carrier (in contrast to the illustrated embodiment, where one PMA module 150 handles all of the alpha sectors of the various carriers, another that handles all of the beta sectors of the various carriers, and so forth).

In the interest of clarity, and to avoid obscuring the invention, only selected components of the base station 200 are illustrated in FIG. 2. However, those skilled in the art will appreciate that the base station 200 may include other components. For example, the base station 200 may include one or more filters to process the received signals. As another example, the base station 200 may include a time and frequency unit (not shown) that synchronizes the base station 200 with other base stations in the communications system 100 (see FIG. 1). As another example, the base station 200 may include a power supply that provides power to the various components of the base station 200 that are shown in FIG. 2.

Figure 3:
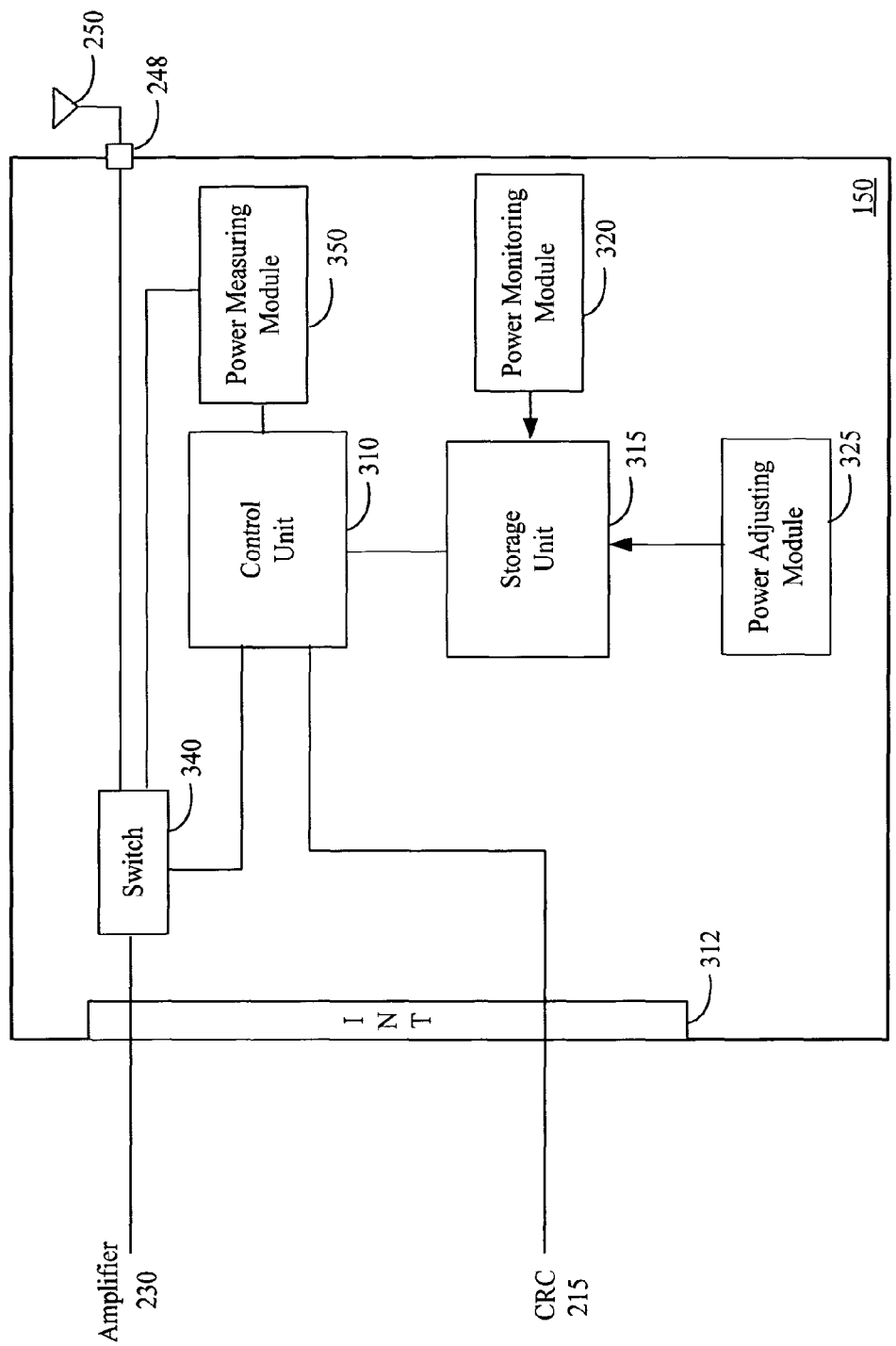
FIG. 3 illustrates a block diagram of a power monitor and adjustment module that may be implemented in the base station of FIG. 2, in accordance with one embodiment of the present invention.

Referring now to FIG. 3, a block diagram of one embodiment of the PMA module 150 of FIG. 2 is illustrated. The PMA module 150 in the illustrated embodiment includes a control unit 310 that is responsive to requests received from the remote control terminal 113 (see FIG. 1) through the CRC 215 (see FIG. 2) via an interface 312 to monitor the RF transmit power and, if desired, adjust the RF transmit power. In one embodiment, the transmit power of various channels (e.g., traffic, synchronization, pilot, paging) is monitored, and, if desired, calibrated to a target level.

The PMA module 150 includes a storage unit 315 that is communicatively coupled to the control unit 310. The PMA module 150 further includes a power monitoring module 320 and a power adjusting module 325. Although not so limited, the modules 320 and 325 are implemented in software and thus storable in the storage unit 315. The acts performed by the power monitoring module 320 and the power adjusting module 325, which are executable by the control unit 310, are described below.

The PMA module 150, in the illustrated embodiment, includes a switch 340 having an input terminal coupled to an output terminal of the amplifier 230 via the interface 312, a first output terminal coupled to the antenna port 248 and a second output terminal coupled to a power measuring module 350. The power measuring module 350 can measure an output level of the signal provided by the amplifier 230. In one embodiment, the power measuring module 350 may include a meter for measuring power. The power measuring module 350 may, in one embodiment, attenuate the signal before measuring the power.

A control input terminal of the switch 340 is coupled to a terminal of the control unit 310. A (control) signal provided by the control unit 310 to the control input terminal of the switch 340 causes the switch 340 to provide a signal either through its first output terminal to the antenna port 248 or through its second output terminal to the power measuring module 350. As described below, during a normal operation mode, the switch 340 provides the signal at its input terminal to the antenna port 248 for transmission to an access terminal 155 (see FIG. 1). During a calibration mode, the switch 340 provides the signal at its input terminal to the power measuring module 350. In one embodiment, the switch 340 may be a multiplexer.

It should be appreciated that the arrangement illustrated in FIG. 3 is exemplary in nature, and that, in alternative embodiments, various other arrangements may be employed without deviating from the spirit and scope of the invention. In one embodiment, the remote control terminal 113 of FIG. 1 may communicate substantially directly with the PMA module 150, without the intermediate CRC 215. In one embodiment, the PMA module 150 may include one or more buses for interconnecting the various elements of the PMA module 150. Similarly, other arrangements may be employed that are consistent with the spirit and scope of the described invention.

Figure 4:
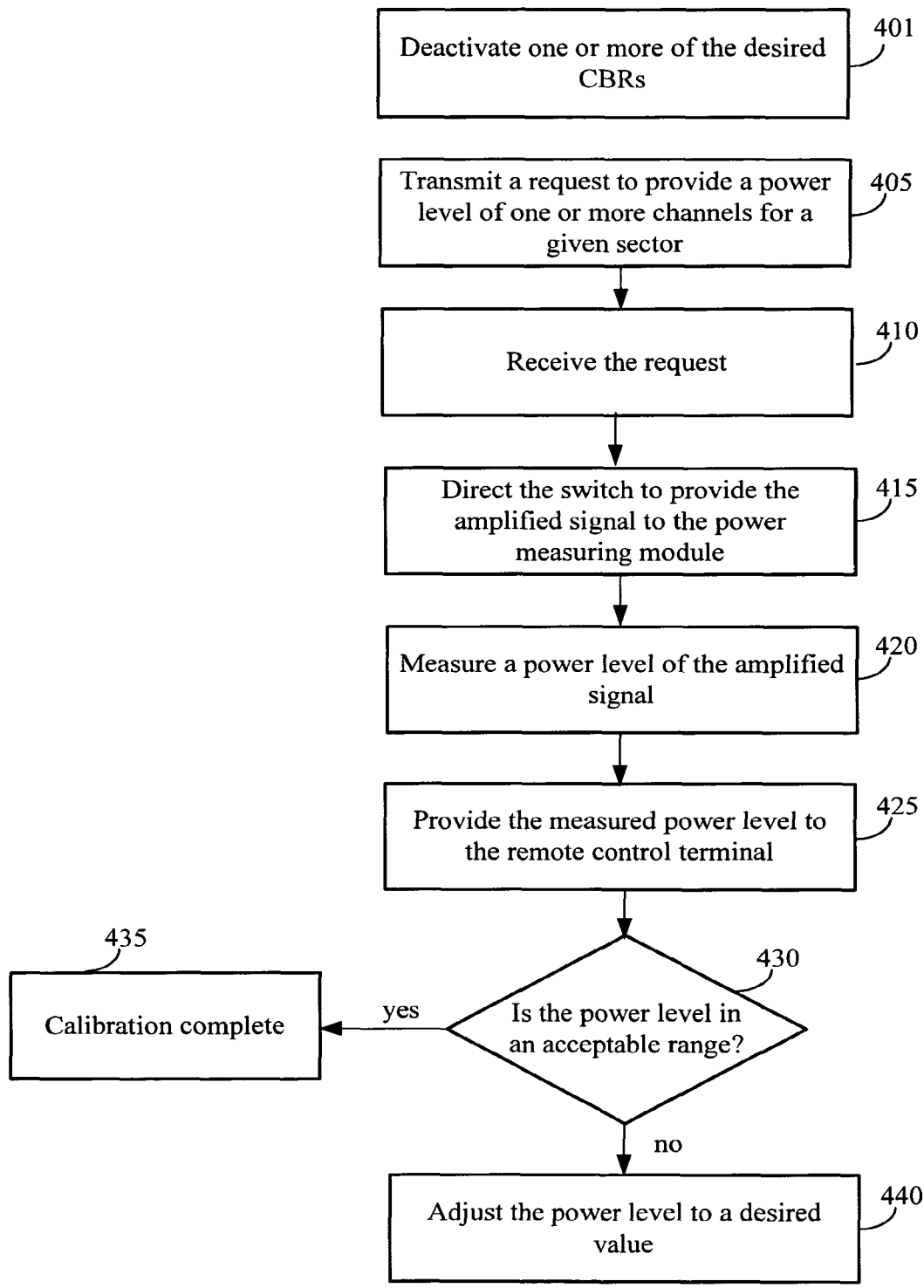
FIG. 4 is a flow diagram of a method that may be implemented in the communications system of FIG. 1, in accordance with one embodiment of the present invention.

Referring now to FIG. 4, a flow diagram of a method for remotely monitoring and calibrating the RF transmit power of one or more components of the base station 200 (see FIG. 2) is illustrated, in accordance with one embodiment of the present invention. Initially, it is assumed that the base station 200 is operating in a normal mode and is transmitting and receiving voice and/or data from the access terminals 155 (see FIG. 1). During the normal operation mode, the signal from the amplifier 230 is provided by the switch 340 to the antenna 250 via the antenna port 248. If a technician wishes to monitor and/or adjust the transmit power level for a given CBR 225, then the signal from the switch 340 is directed to the power measuring module 350 instead of the antenna port 248. For the purposes of this discussion, the CBR 225 that the technician desires to monitor and/or adjust is hereinafter referred to as the "target CBR."

To monitor and, if desired adjust, the power level associated with the target CBR 225, the technician, using the remote control terminal 113 (see FIG. 1), first deactivates (at 401) one or more of the other CBRs 225. In one embodiment, all of the CBRs 225 other than the target CBR is deactivated. In an alternative embodiment, only those CBRs 225 that are in the same sector as the target CBR are deactivated. In one embodiment, each CBR 225 in the base station 200 may have a unique identifier (e.g., address) by which it can be accessed from the remote control terminal unit 113. This allows the technician the option to activate or deactivate the desired CBRs 225.

Once the desired CBRs 225 are deactivated, the technician transmits (at 405) a request to the base station 200 to provide a transmit power level associated with the target CBR 225. The request, in the illustrated embodiment, is provided to the PMA module 150 that is associated with the CBR 225 for which the power levels are to be monitored and/or adjusted.

For example, if the technician is interested in monitoring the power levels associated with the first CBR 225(1) of the second cell module 210(2), then the remote control terminal 113 provides the request to the PMA module 150 (via the CRC 215) of the first cell module 210(1). The request is provided to the PMA module 150 of the first cell module 210(1) because the target CBR (i.e., the first CBR 225(1) of the second cell module 210(2)) is associated with the alpha sector, and the alpha sector signals, in the illustrated embodiment, are handled by the PMA module 150 of the first cell module 210(1). For ease of illustration, it is herein assumed that the technician desires to monitor and calibrate the power level associated with the first CBR 225(1) of the second cell module 210(2) (i. e., the target CBR is the first CBR 225(1) of the second cell module 210(2)).

Because the target CBR belongs to the alpha sector in the illustrated embodiment, the CRC 215 of the first cell module 210(1) receives (at 410) the request and provides it to the appropriate PMA module 150 (in this example, the PMA module 150 associated with the first cell module 210(1)). The power monitoring module 320 (see FIG. 3) of the PMA module 150, upon detecting the request from the CRC 215, causes the control unit 310 to provide a signal to the control input terminal of the switch 340. The control unit 310 directs (at 415) the switch 340 to provide the signal that it receives from target CBR 225 (via the amplifier 230) to the power measuring module 350 (instead of the antenna port 248).

The power measuring module 350 measures (at 420) the power level of the signal provided by the target CBR 225(1) of the second cell module 210(2) via the amplifier 230 of the first cell module 210(1). In one embodiment, measuring (at 420) the power level of the signal may comprise measuring the power level of one or more of the channels (e.g., pilot, synchronization, paging, traffic, etc.,) associated with the target CBR 225, which in the illustrated example is the first CBR 225(1) of the second cell module 210(2).

The power monitoring module 320 provides (at 425) the measured power level to the remote control terminal 113. The technician situated at the remote control terminal 113, upon reviewing the measured power level, determines (at 430) if it is within an acceptable range. The acceptable range may be defined by a specification of the base station 200. In an alternative embodiment, instead of the technician, the PMA module 150 may determine (at 430) if the measured power level is within an acceptable range. The PMA module 150 may make such a determination based on pre-stored acceptable power level values in the storage unit 315 (see FIG. 3), or, alternatively, based on an acceptable power level range provided by the technician.

If it is determined (at 430) that the measured power level is within the acceptable range, then the calibration process is complete (at 435). If, on the other, the measured power level is outside the acceptable range, then the technician may adjust (at 440) the power level to a desired level using the remote control terminal 113. This may be accomplished in one of several ways. In one embodiment, the power level may be adjusted by transmitting a request from the remote control terminal 113 to the CRC 215 to adjust the power level of the target CBR 225 to the desired level. In alternative embodiment, a request may be transmitted to the PMA module 150, which then instructs the CRC 215 to adjust the power level of the target CBR 225 to the desired level. In one embodiment, adjusting the power level of the target CBR 225 may comprise adjusting the power level of one or more of the channels associated with the target CBR 225.

For illustrative purposes, it is herein assumed that the technician provides a request to the PMA module 150 (via the CRC 215) to adjust the power level of the target CBR 225 to the desired level. Once the request is transmitted, the power adjusting module 325 of the PMA module 150 receives the request from the remote control terminal 113, and based on the request, indicates, in one embodiment, to the CRC 215 to adjust the attenuation level of the CBR 225. The direction in which the attenuation level is adjusted depends on the measured power level. Thus, for example, if the measured power level (at 420) was higher than desired, then the power adjusting module 325 of the PMA module 150 instructs the CRC 215 to increase the attenuation level of the target CBR 225 to decrease the transmit power level. Conversely, if the measured power level (at 420) was lower than desired, then the CRC 215 is directed to decrease the attenuation level of the target CBR 225 to increase the transmit power level.

In one embodiment, one or more steps of the method of FIG. 4 may be repeated as desired after the power level is adjusted. That is, the technician may wish to verify that, after adjusting the attenuation level of the target CBR 225, the transmit power level of the target CBR 225 is within an acceptable range. This may be accomplished by monitoring the transmit power level of the target CBR 225 after the attenuation level has been adjusted.

In accordance with one or more embodiments of the present invention, a technician can remotely monitor, and if desired, adjust the power level of the target CBR 225 of the base station 200. As such, the ability to remotely calibrate the transmit power reduces the need of dispatching technicians to the physical location of the base station 200, thereby reducing the time required to perform power calibration procedures. Moreover, because calibration is automated, the possibility of errors is reduced in comparison to the conventional, manual techniques of calibration.

While the present invention is described in the context of the base station 111 (see FIG. 1) operating in a wireless communications system, it should be appreciated that the one or more embodiments of the present invention may also be applicable to other types of transmitters, such as an access point or a router of a wireless communications system, a base station of a cordless telephone system, and the like.

Those skilled in the art will appreciate that the various system layers, routines, or modules illustrated in the various embodiments herein may be executable control units (such as the control unit 310 (see FIG. 3)). The control unit 310 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 310 causes the corresponding system to perform programmed acts.

The particular embodiments disclosed above are illustrative only, as the invention may be modified and practiced in different but equivalent manners apparent to those skilled in the art having the benefit of the teachings herein. Further-more, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method, comprising:
receiving, at a base station from a mobile switching center, a request to provide a power level of a signal generated by a transmitting component of the base station for a cellular network communications system; measuring, at the base station, the power level of the signal generated by the transmitting component in response to receiving the request from the mobile switching center; and providing, from the base station to the mobile switching center, the measured power level.

2. The method of claim 1, wherein communication between the base station and the mobile switching center comprises High-level Data Link Control (HDLC);
wherein the base station comprises at least one power monitor and adjustment (PMA) module adapted to handle one or more requests from the remote unit, wherein the power monitor and adjustment module comprises a switch adapted to toggle at least one input port between a calibration mode of operation and a normal mode of operation, wherein the power monitor and adjustment module is adapted to provide a signal to a power measuring module adapted to measure power;
wherein measuring the power level comprises measuring the power level of at least two communication channels; and
further determining if the measured power level is within an acceptable range, wherein determining comprises at least one of comparing the measured power level to a pre-defined value at the power monitor adjustment module, comparing, at the power monitor adjustment module, the measured power level to a range of acceptable values provided by the remote unit, and comparing the measured power level to a value at the remote unit.

3. The method of claim 2, further comprising receiving a request from the mobile switching center to adjust a power level of an output signal provided by the transmitting component in response to determining that the measured power level is outside the acceptable range.

4. The method of claim 2, further comprising adjusting the power level of an output signal provided by the transmitting component in response to determining that the measured power level is outside the acceptable range.

5. The method of claim 4, wherein adjusting the power level comprises attenuating the output signal provided by the transmitting component by a pre-selected amount in response to determining that the measured power level is higher than desired.

6. The method of claim 4, wherein adjusting the power level comprises decreasing an amount of attenuation applied to the output signal provided by the transmitting component by a pre-selected amount in response to determining that the measured power level is lower than desired.

7. The method of claim 1, wherein the transmitting component is a baseband radio and wherein signal provided by the baseband radio is deliverable to one of an antenna port and a power meter, and wherein measuring the power level comprises directing the signal provided by the baseband radio to the power meter in response to receiving the request from the mobile switching center.

8. The method of claim 1, wherein the transmitting component is a baseband radio, and wherein measuring the power level comprises measuring the power level of at least one of a paging channel, synchronization channel, access channel, traffic channel, and pilot channel.

9. The method of claim 1, wherein the communications protocol is a high-level data link control protocol.

10. The method of claim 9, wherein the base station comprises at least a second transmitting component, wherein measuring the power level comprises deactivating the second transmitting component before measuring the power level.

11. An article comprising one or more machine-readable storage media containing instructions that when executed enable a processor to:
receive, at a base station, a request from a mobile switching center to indicate a power level of a signal provided by a transmitting component of the base station;
measure, at the base station, a power level of the signal in response to receiving the request from the mobile switching center;
determine, at the base station, if the measured power level is at an acceptable level; and
adjust, at the base station, a power level of an output signal provided by the transmitting component by a pre-selected level in response to determining that the measured power level is not at the acceptable level.

12. The article of claim 11, wherein the instructions when executed enable the processor to increase the power of the output signal by decreasing an amount of attenuation that is applied to the output signal.

13. The article of claim 11, wherein the instructions when executed enable the processor to decrease the power of the output signal by attenuating the output signal by a pre-selected amount.

14. The article of claim 11, wherein the instructions when executed enable the processor to receive the request over a communications protocol from a mobile services switching station associated with the base station.

15. The article of claim 11, wherein the transmitting component is a baseband radio and wherein a signal provided by the baseband radio is deliverable to one of an antenna port and a power meter, wherein the instructions when executed enable the processor to direct the signal provided by the baseband radio to the power meter in response to receiving the request from the mobile switching center.

16. An apparatus, comprising a base station, the apparatus comprising:
an interface adapted to receive a request from a mobile switching center to provide a transmit power level of a first component of the base station; and
a control unit communicatively coupled to the interface, the control unit adapted to:
determine a power level of an output signal of the first component in response to the request; and
provide the determined power level of the output signal of the first component to the mobile switching center.

17. The apparatus of claim 16, wherein the output signal comprises at least one of a paging channel, synchronization signal, traffic channel, access channel, and pilot channel, and wherein the control unit is further adapted to determine if the measured power level is at an acceptable level.

18. The apparatus of claim 17, wherein the control is further adapted to adjust a power level of an output signal provided by the transmitting component by a pre-selected level in response to determining that the measured power level is not at the acceptable level.

19. The apparatus of claim 18, wherein the control unit is adapted to adjust the power level by adjusting an amount of attenuation that is applied to the output signal.

20. The apparatus of claim 16, further comprising a power meter, wherein the control unit is adapted to provide the output signal of the first component to the power meter.

21. The apparatus of claim 20, further comprising a switch device adapted to receive the output signal from the first component and adapted to provide the output signal to at least one of an antenna port and the power meter in response to receiving a signal from the control unit.

22. The apparatus of claim 16, wherein the base station comprises a second component, and wherein the control unit is adapted to deactivate the second component of the base station before determining the power level of the output signal of the first component.

23. The apparatus of claim 22, wherein the first component is a baseband radio associated with an alpha sector of a first carrier and the second component is a baseband radio associated with the alpha sector of a second carrier.

24. A communications system, comprising:
  a mobile switching center adapted to provide a request to calibrate a transmit power level;
  a base station for a cellular communications system communicatively coupled to the mobile switching center, the base station adapted to:
    receive the request;
    measure a power level of a signal provided by a transmitting component;
    determine if the measured power level is at an acceptable level; and
    adjust a power level of an output signal provided by the transmitting component by a pre-selected level in response to determining that the measured power level is not at the acceptable level.

25. The system of claim 24 wherein the base station is adapted to provide a three-carrier, three-sector coverage.

26. The system of claim 24 wherein the base station is adapted to provide a six-carrier, six-sector coverage.

27. The system of claim 24, wherein the base station is associated with at least one of a local area network and a cordless communications system.

28. An apparatus, comprising a base station, the apparatus comprising:
  means for receiving, at the base station, a request from a mobile switching center to provide a power level associated with a transmitting component, wherein the request is transmitted over a communications protocol;
  means for measuring, at the base station, a power level of a signal provided by the transmitting component in response to receiving the request from the mobile switching center; and
  means for providing, from the base station, the measured power level to the mobile switching center over the communications protocol.

* * * * *